(12) United States Patent
Pan et al.

(10) Patent No.: US 9,241,356 B2
(45) Date of Patent: Jan. 19, 2016

(54) MOBILE AUDIO STREAM BROADCASTING METHOD AND SYSTEM

(71) Applicant: LITE-ON TECHNOLOGY CORPORATION, Taipei (TW)

(72) Inventors: Yi-An Pan, New Taipei (TW); Chung-Ling Lee, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 17 days.

(21) Appl. No.: 14/219,411

(22) Filed: Mar. 19, 2014

(65) Prior Publication Data

US 2015/0195857 A1 Jul. 9, 2015

(30) Foreign Application Priority Data

Jan. 6, 2014 (TW) .............................. 103100446 A (51) Int. Cl.
*H04B 7/00* (2006.01)
*H04W 76/02* (2009.01)
*H04W 4/00* (2009.01)

(52) U.S. Cl.
CPC .............. *H04W 76/02* (2013.01); *H04W 4/008* (2013.01)

(58) Field of Classification Search
CPC ..... H04W 4/008; H04M 1/72527; H04R 5/02
USPC ................................ 381/300; 455/41.2, 41.3
See application file for complete search history.

(56) References Cited

U.S. PATENT DOCUMENTS

| | | | |
|---|---|---|---|
| 2005/0233695 A1* | 10/2005 | Cho .............................. | 455/13.4 |
| 2011/0065389 A1* | 3/2011 | Masuda .............. | H04M 1/7253 455/41.2 |
| 2012/0171958 A1* | 7/2012 | Cornett et al. ............... | 455/41.2 |
| 2012/0300962 A1* | 11/2012 | Devoto .......................... | 381/300 |

\* cited by examiner

*Primary Examiner* — Ayodeji Ayotunde
(74) *Attorney, Agent, or Firm* — Li & Cai Intellectual Property (USA) Office (57) ABSTRACT

A mobile audio stream broadcasting method has steps as follows: establishing a fist Bluetooth (BT) connection between a mobile device and at least one of a plurality of BT speakers; detecting connection signal strength and designating the BT speaker with maximum of connection signal strength as a first BT target speaker; establishing a second BT connection; transmitting an audio stream data to the first BT target speaker for broadcasting music via the second BT connection; detecting connection signal strength of the first BT target speaker continuously and automatically via the first BT connection; determining whether connection signal strength of the first BT target speaker is lower than a preset threshold value; if connection signal strength of the first BT target speaker is lower than the preset threshold value, then disconnecting the first and the second BT connections between the mobile device and the first BT target speaker.

7 Claims, 3 Drawing Sheets

MOBILE AUDIO STREAM BROADCASTING METHOD AND SYSTEM

BACKGROUND OF THE INVENTION

1. Field of the Invention

The instant disclosure relates to a mobile audio stream broadcasting method and a mobile audio stream broadcasting system; in particular, to a mobile audio stream broadcasting method and a mobile audio stream broadcasting system which can automatically switch or disconnect the connection according to the location of a mobile device.

2. Description of Related Art

Bluetooth is a wireless communication technology able to be applied to computer, mobile phone, and other electric devices. The operation of Bluetooth is to transport with the bandwidth of 2.45 GHz. In addition to digital data, the audio information can be transmitted also. Each device using Bluetooth communication technology has a 48-bit address set according to the IEEE 802 standard, which allows an one-to-one connection or an one-to-many connection and allows a maximum transmitting distance of 10 meters. The Bluetooth technology not only allows a big amount of transmission and also gives the transmitting speed reaching to 1 MB per second. Also, the Bluetooth technology allows setting codes for protection, and allows the frequency to change for 1,600 times per minute. Thus, it is hard to have an interception and wouldn't be interfered by the electromagnetic wave. With the well-developed technology, currently, the smart phone can be matched with wireless peripheral equipments having Bluetooth chips via the Bluetooth wireless transmitting technology, and then the user can use the matched wireless peripheral equipments together with the smart phone. In particular, the Bluetooth speaker is one of the focused and popular products, which makes the user to broadcast the audio data stored in the smart phone anytime and anywhere. The generally Bluetooth speaker is an one-to-one device, which means that one smart phone is corresponded to one speaker. Even for the speaker having multi-drop connection, it is generally for several smart phones to be corresponded to one speaker.

SUMMARY OF THE INVENTION

The instant disclosure provides a mobile audio stream broadcasting method, comprising steps as follows: searching for a plurality of Bluetooth speakers, using a mobile device, in a space; finding at least one of the Bluetooth speakers, using the mobile device, within a first effective radius range taking the mobile device as the center; establishing a first Bluetooth connection between the mobile device and at least one of the Bluetooth speakers; determining whether an identification code of at least one of the Bluetooth speakers corresponds to a preset identification code by the mobile device via the first Bluetooth connection; detecting a connection signal strength of the Bluetooth speaker corresponding to the preset identification code and designating the Bluetooth speaker with maximum of the connection signal strength as a first Bluetooth target speaker, if the identification code of at least one of the Bluetooth speakers corresponds to the preset identification code; establishing a second Bluetooth connection between the mobile device and the first Bluetooth target speaker; transmitting an audio stream data to the first Bluetooth target speaker by the mobile device via the second Bluetooth connection for audio-stream broadcasting; detecting the connection signal strength of the first Bluetooth target speaker continuously and automatically by the mobile device via the first Bluetooth connection; determining whether the connection signal strength of the first Bluetooth target speaker is lower than a preset threshold value; maintaining the first Bluetooth connection and the second Bluetooth connection between the mobile device and the first Bluetooth target speaker, if the connection signal strength of the first Bluetooth target speaker is not lower than the preset threshold value; transmitting a control signal by the mobile device to control the first Bluetooth target speaker to enter into a standby state and disconnecting the first Bluetooth connection and the second Bluetooth connection between the mobile device and the first Bluetooth target speaker, if the connection signal strength of the first Bluetooth target speaker is lower than the preset threshold value, and returning back to the space, finding and designating a second Bluetooth target speaker within a second effective radius range taking the mobile device as the center, transmitting the audio stream data to the second Bluetooth target speaker by the mobile device via the second Bluetooth connection for audio-stream broadcasting.

In an embodiment of the instant disclosure, after the step that maintaining the first Bluetooth connection and the second Bluetooth connection between the mobile device and the first Bluetooth target speaker, if the connection signal strength of the first Bluetooth target speaker is not lower than the preset threshold value, it returns back to the step that detecting the connection signal strength of the first Bluetooth target speaker continuously and automatically.

In an embodiment of the instant disclosure, after the step that determining whether an identification code of at least one of the Bluetooth speakers corresponds to a preset identification code by the mobile device via the first Bluetooth connection, it further comprises: disconnecting the first Bluetooth connection between the mobile device and the Bluetooth speaker not corresponding to the preset identification code, if the identification code of at least one of the Bluetooth speakers does not correspond to the preset identification code In an embodiment of the instant disclosure, before the step that detecting the connection signal strength of the first Bluetooth target speaker continuously and automatically by the mobile device via the first Bluetooth connection, it further comprises: transmitting an address code to the first Bluetooth target speaker by the mobile device via the first Bluetooth connection.

The instant disclosure provides a mobile audio stream broadcasting system, comprising a mobile device and a plurality of Bluetooth speakers. The mobile audio stream broadcasting system searches for a plurality of Bluetooth speakers in a space and finds at least one of the Bluetooth speakers using the mobile device within a first effective radius range taking the mobile device as the center. A first Bluetooth connection is established between the mobile device and at least one of the Bluetooth speakers and the mobile device determines whether an identification code of at least one of the Bluetooth speakers corresponds to a preset identification code via the first Bluetooth connection. A connection signal strength of the Bluetooth speaker corresponding to the preset identification code is detected and the Bluetooth speaker with maximum of the connection signal strength is designated as a first Bluetooth target speaker, if the identification code of at least one of the Bluetooth speakers corresponds to the preset identification code. A second Bluetooth connection between the mobile device and the first Bluetooth target speaker is established, and an audio stream data is transmitted to the first Bluetooth target speaker by the mobile device via the second Bluetooth connection for audio-stream broadcasting. The mobile device detects the connection signal strength of the first Bluetooth target speaker continuously and automatically by the mobile device via the first Bluetooth connection and determines whether the connection signal strength of the first Bluetooth target speaker is lower than a preset threshold value. The first Bluetooth connection and the second Bluetooth connection between the mobile device and the first Bluetooth target speaker are maintained, if the connection signal strength of the first Bluetooth target speaker is not lower than the preset threshold value. The mobile device transmits a control signal to control the first Bluetooth target speaker to enter into a standby state and disconnects the first Bluetooth connection and the second Bluetooth connection between the mobile device and the first Bluetooth target speaker, if the connection signal strength of the first Bluetooth target speaker is lower than the preset threshold value. After that, it returns back to the space, finds and designates a second Bluetooth target speaker within a second effective radius range taking the mobile device as the center. The first Bluetooth connection and the second Bluetooth connection with the second Bluetooth target speaker are established, and the audio stream data is transmitted to the second Bluetooth target speaker by the mobile device via the second Bluetooth connection for audio-stream broadcasting.

In an embodiment of the instant disclosure, the first Bluetooth connection between the mobile device and the Bluetooth speaker not corresponding to the preset identification code is disconnected, if the identification code of at least one of the Bluetooth speakers does not correspond to the preset identification code.

In an embodiment of the instant disclosure, an address code is transmitted to the first Bluetooth target speaker by the mobile device via the first Bluetooth connection.

To sum up, the mobile audio stream broadcasting method and the mobile audio stream broadcasting system can detect the connection signal strength of the Bluetooth speaker via the first Bluetooth connection, and can transmit the audio stream data to the Bluetooth target speaker for broadcasting via the second Bluetooth connection. Accordingly, the instant disclosure can automatically detect the connection signal strength between the mobile device and the Bluetooth speaker to make a connection or disconnection, so as to avoid the inconvenience when the user manually switches between speakers in a multi-speakers environment. The instant disclosure can increase the convenience for use and can switch between different Bluetooth target speakers for broadcasting music according to the location of the mobile device which changes when the user moves, such that the user can enjoy music anywhere he moves.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[One Embodiment of the Mobile Audio Stream Broadcasting System)]

Figure 1:
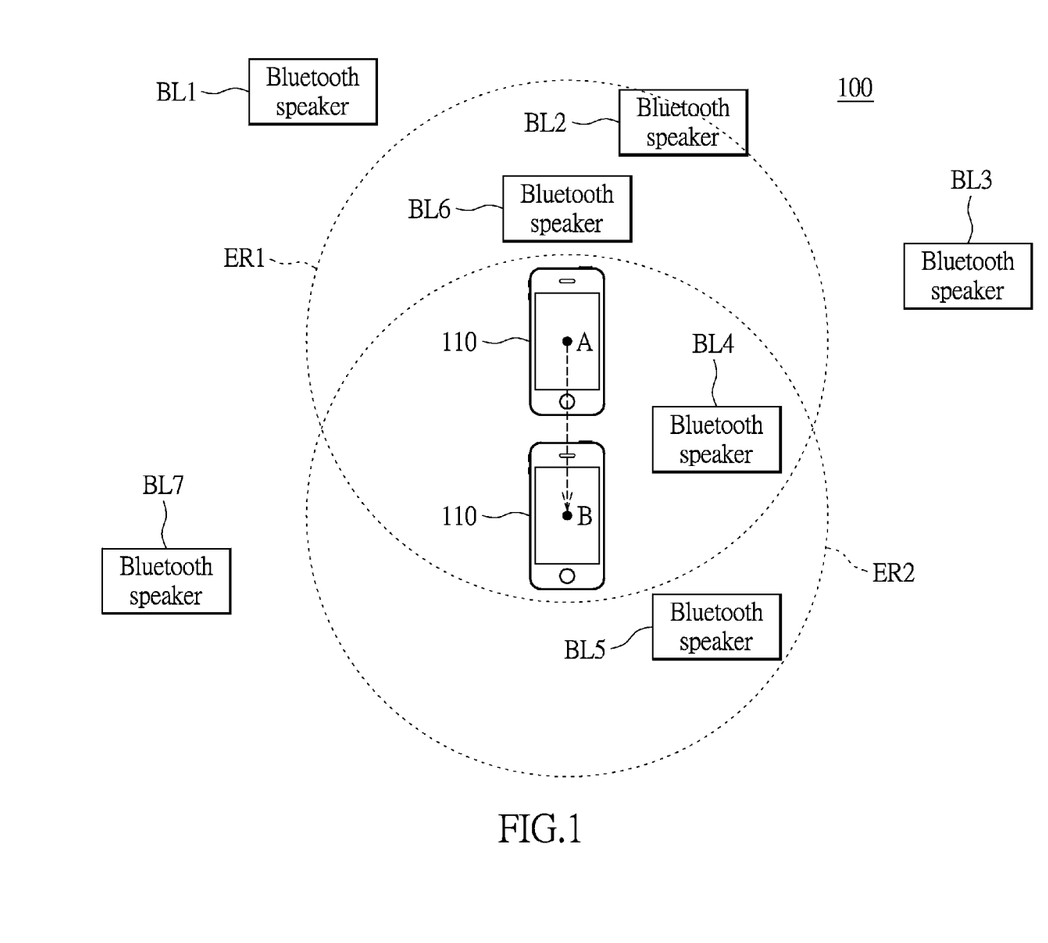
FIG. 1 shows a schematic diagram of a mobile audio stream broadcasting system according to an embodiment of the instant disclosure.

Please refer to FIG. 1, FIG. 1 shows a schematic diagram of a mobile audio stream broadcasting system according to an embodiment of the instant disclosure. As shown in FIG. 1, the mobile audio stream broadcasting system 100 comprises a mobile device 110 and a plurality of Bluetooth speakers BL1~BL7. In the present embodiment, assumed that the Bluetooth communication function of the mobile device 110 and the Bluetooth speakers BL1~BL7 are turned on, when the user tends to use the mobile device 110 and at least one of the Bluetooth speakers BL1~BL7 for audio-stream broadcasting, the mobile audio stream broadcasting system 100, using the mobile device 110, searches for at least one of the Bluetooth speakers BL1~BL7 in a space. After the mobile device 110 finds at least one of the Bluetooth speakers BL1~BL7 within an effective radius range ER1 taking the mobile device 110 as the center, there would be a matching and a connection. In other words, a first Bluetooth connection is established between the mobile device 110 and the Bluetooth speaker, wherein the mobile device 110 may be a smart phone, a pad, or a laptop. It should be noticed that, the Bluetooth (BT) technology used by the instant disclosure is the core technical specification of the Bluetooth 4.0.

To be detailed, the core technical specification of the Bluetooth 4.0 includes the traditional Bluetooth technology, such as Bluetooth 2.1+EDR, the Bluetooth 3.0+High Speed and the latest Bluetooth low energy (BLE), in particular, the Bluetooth low energy (BLE) is the major advantage of the Bluetooth 4.0. The Bluetooth low energy (BLE) can save almost 90% of power, which is needed for the market of the device using button cell battery. Because of the Bluetooth low energy (BLE), the device can start the Bluetooth function merely when the data needs to be transmitted and can enter into a sleep mode when idling. It effectively reduces the power consumption, so as to effectively extend the life-time of the battery. In the present embodiment, the first Bluetooth connection established between the mobile device 110 and the Bluetooth speaker, such as the Bluetooth speaker BL6, is the Bluetooth low energy (BLE). In terms of transmitting distance, for the traditional Bluetooth technology, it is roughly 30 foots (about 10 meters), but for the Bluetooth 4.0, it could be effectively increased to roughly 200 foots (about 60 meters). The producer can adjust the range of the radio frequency according to the product features, which extends the application of the Bluetooth.

It is worth mentioning that, both Single Mode and Dual Mode are developed in the Bluetooth 4.0. Via the Single Mode, it can realize the transmission with very low power consumption via an easy search for device, one-to-many data transmitting and the advanced power-saving technology and coding. On the other hand, via the Dual Mode, Bluetooth technology with different standards can be combined for use, such as 2.1+EDR or 4.0+BLE in the present embodiment, the user can switch to a high-speed or a low power-consumption operation mode depending one needs. To be concluded, the Single Mode can be applied to device with need for a long-time connection but not for continuously transmitting data, but the Dual Mode can be applied to the device which may need the transmission between different types of products, such as computer and mobile phone. In other words, the Bluetooth 4.0 standard allows the traditional Bluetooth technology, the Bluetooth 3.0+High Speed and the Bluetooth low energy (BLE) to independently exist and to be used together.

Afterwards, in the instant disclosure, the mobile device 110 determines whether the identification code of the Bluetooth speaker corresponds to the preset identification code via a first Bluetooth connection (BT4.0+BLE). If the identification code of the Bluetooth speaker corresponds to the preset identification code, the mobile device 110 detects the connection signal strength of the Bluetooth speaker via the first Bluetooth connection, designates the Bluetooth speaker having the maximum of the connection signal strength as a Bluetooth target speaker, and establishes a second Bluetooth connection (BT2.1+EDR) between the mobile device 110 and the Bluetooth target speaker. After that, the mobile device 110 transmits the audio stream data to the Bluetooth target speaker via the second Bluetooth connection for audio-stream broadcasting. At the same time, the mobile device 110 continuously and automatically detects the connection signal strength of the Bluetooth target speaker via the first Bluetooth connection, and determines whether the connection signal strength of the Bluetooth target speaker is lower than a preset threshold value. If the connection signal strength of the Bluetooth target speaker is not lower than a preset threshold value, the first Bluetooth connection and the second Bluetooth connection between the mobile device 110 and the Bluetooth target speaker are maintained.

In the following description is further instruction in teaching a work mechanism of the mobile audio stream broadcasting system 100.

Referring to FIG. 1, for example, when the user tends to have a audio-stream broadcasting via the mobile device 110 (at the location A) and the Bluetooth speaker, the mobile device 110 brought by the user would search for a plurality of Bluetooth speakers BL1~BL7 in a space, and find at least one of the Bluetooth speakers within the first effective radius range ER1 taking the mobile device 110 as the center, that is, the Bluetooth speakers BL2, BL4 and BL6 (as shown in FIG. 1). It is worth mentioning that, at this time, the Bluetooth speakers BL2, BL4 and BL6 within an effective radius range ER1 are defined as Bluetooth speakers in the first group. Afterwards, the mobile device 110 determines whether the identification code of each of the Bluetooth speakers BL2, BL4 and BL6 corresponds to a preset identification code via the first Bluetooth connection. If there is the identification code of the Bluetooth speakers BL2, BL4 or BL6 not corresponding to the preset identification code, the mobile device 110 would disconnect the first Bluetooth connection with the Bluetooth speaker having the identification code not corresponding to the preset identification code, so as to exclude the Bluetooth speaker not produced via the instant disclosure. If there is the identification code of the Bluetooth speakers BL2, BL4 or BL6 corresponding to the preset identification code, the mobile device 110 starts to detect the connection signal strength of the Bluetooth speaker having the identification code corresponding to the preset identification code, and to designate the Bluetooth speaker having the maximum of the connection signal strength (one of Bluetooth speakers BL2, BL4 and BL6) as a first Bluetooth target speaker. As shown in FIG. 1, for instance, the connection signal strength between the mobile device 110 and the Bluetooth speaker BL6 is maximum, the mobile device 110 would designate the Bluetooth speaker BL6 as the first Bluetooth target speaker via the first Bluetooth connection. After that, there is a second Bluetooth connection (BT2.1+EDR) established between the mobile device 110 and the first Bluetooth target speaker, such as the Bluetooth speaker BL6, and the mobile device 110 transmits the audio stream data, such as a music information, to the first Bluetooth target speaker, such as the Bluetooth speaker BL6, via the second Bluetooth connection for audio-stream broadcasting. Also, the mobile device 110 continuously and automatically detects the connection signal strength of the first Bluetooth target speaker via the first Bluetooth connection. In another embodiment, when the user is watching a video via the mobile device 110, the audio stream data of the video is transmitted to the first Bluetooth target speaker via the second Bluetooth connection for audio-stream broadcasting, and the audio stream data of the video would be broadcasted via the display panel of the mobile device 110 or other display devices.

In a further instruction, when the user takes the mobile device 110 from the location A to the location B, according to the connection signal strength detected by the mobile device 110 via the first Bluetooth connection, it can be known that the Bluetooth speaker BL6 is beyond the effective radius range ER1 of the mobile device 110 and that the connection signal strength of the Bluetooth speaker BL6 has been lower than the preset threshold value. Thus, the mobile device 110 first transmits the control signal via the first Bluetooth connection to make the first Bluetooth target speaker, such as the Bluetooth speaker BL6, enter into standby state, then disconnects the first Bluetooth connection and the second Bluetooth connection between the mobile device 110 and the first Bluetooth target speaker, such as the Bluetooth speaker BL6, and finds and designates a second Bluetooth target speaker within the effective radius range ER2 taking the mobile device 110 as the center. The mobile device 110 at the location B would search for at least one of the Bluetooth speakers BL1~BL7. As shown in FIG. 1, the Bluetooth speaker BL5 enters into the effective radius range ER2 of the mobile device 110. Therefore, at this time, the Bluetooth speakers BL4 and BL5 within the effective radius range ER2 are defined as the Bluetooth speakers in the second group. The mobile device 110 at the location B would establish the first Bluetooth connection with the Bluetooth speaker BL5 and maintains the first Bluetooth connection with the Bluetooth speaker BL4. Afterwards, the mobile device 110 detects the connection signal strength of the Bluetooth speakers BL4 and BL5 via the first Bluetooth connection. The mobile device 110 designates the Bluetooth speaker having the maximum connection signal strength, such as the Bluetooth speaker BL4, as the second Bluetooth target speaker, and the mobile device 110 establishes the second Bluetooth connection with the second Bluetooth target speaker. After that, the mobile device 110 transmits the audio stream data to the second Bluetooth target speaker, such as the Bluetooth speaker BL4, for the continuous audio-stream broadcasting. It is worth mentioning that, in the mobile audio stream broadcasting system 100 provided by the instant disclosure, the mobile device 110 can transmit the audio stream data from one Bluetooth speaker to another Bluetooth speaker in a real-time way according to the connection signal strength (that is, transmitting from the first Bluetooth target speaker to the second Bluetooth target speaker), so as to let the user listen continuously. It should be noticed that, the above "in a real-time way" means that the human ears can not tell the disconnection of the audio stream data. For example, when the mobile device 110 is taken from the location A to the location B, the mobile device 110 can continuously transmit the audio stream data which is transmitted to the Bluetooth speaker BL6 (the first Bluetooth target speaker) to the Bluetooth speaker BL4 (the second Bluetooth target speaker) instantaneously without any delay time, such that the user can listen to music with comforts but without interruption.

Figure 2:
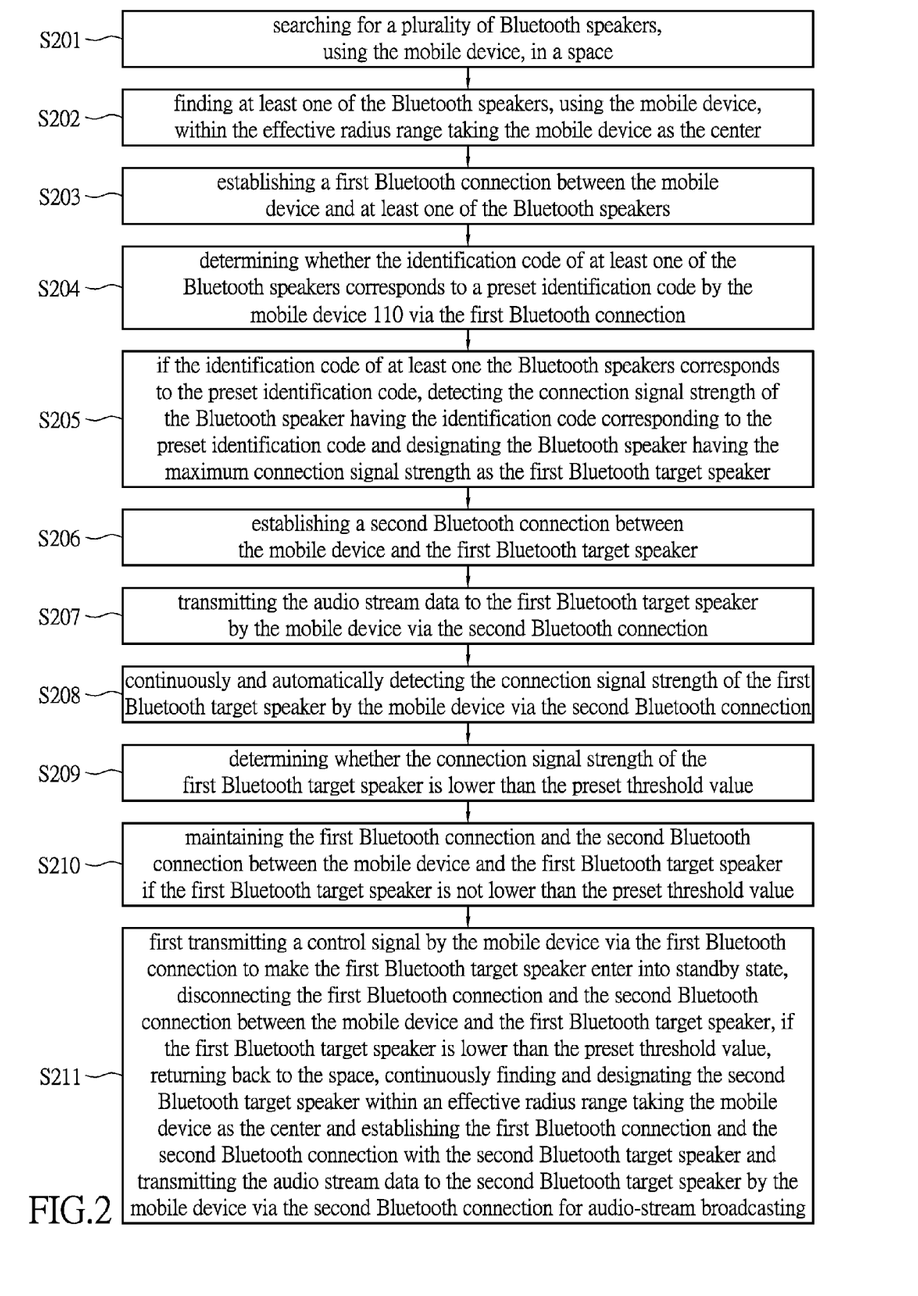
FIG. 2 shows a flow chart of a mobile audio stream broadcasting method according to an embodiment of the instant disclosure.

Regarding to the mobile audio stream broadcasting method, in conjunction with FIG. 1 and FIG. 2, FIG. 2 shows a flow chart of a mobile audio stream broadcasting method according to an embodiment of the instant disclosure. An explanatory sequence of steps in the present embodiment may be embodied with the mobile audio stream broadcasting system 100 as shown in FIG. 1, and thus please refer to FIG. 1 for an easy understanding. The mobile audio stream broadcasting method comprises steps as follows: searching for a plurality of Bluetooth speakers, using a mobile device, in a space, for example in FIG. 1, searching for a plurality of Bluetooth speakers BL1~BL7 using the mobile device 110, in a space (Step S201); finding at least one of the Bluetooth speakers, using the mobile device 110, within the effective radius range ER1 taking the mobile device 110 as the center, for example in FIG. 1, finding the Bluetooth speakers BL2, BL4 and BL6 within the effective radius range (Step S202); establishing a first Bluetooth connection between the mobile device and at least one of the Bluetooth speakers, for example, establishing a first Bluetooth connection between the mobile device with the Bluetooth speakers BL2, BL4 and BL6, respectively (Step S203); determining whether the identification code of at least one of the Bluetooth speakers corresponds to a preset identification code by the mobile device 110 via the first Bluetooth connection, for example, determining whether the identification code of each of the speakers BL2, BL4 and BL6 corresponds to the preset identification code (Step S204); if the identification code of at least one the Bluetooth speakers, such as the speakers BL2, BL4 and BL6, corresponds to the preset identification code, detecting the connection signal strength of the Bluetooth speaker having the identification code corresponding to the preset identification code and designating the Bluetooth speaker having the maximum connection signal strength, such as the Bluetooth speaker BL6, as the first Bluetooth target speaker (Step S205); establishing a second Bluetooth connection between the mobile device and the first Bluetooth target speaker, such as the Bluetooth speaker BL6 (Step S206); transmitting the audio stream data to the first Bluetooth target speaker, such as the Bluetooth speaker BL6, by the mobile device via the second Bluetooth connection (Step S207); continuously and automatically detecting the connection signal strength of the first Bluetooth target speaker, such as the Bluetooth speaker BL6, by the mobile device via the second Bluetooth connection (Step S208); determining whether the connection signal strength of the first Bluetooth target speaker, such as the Bluetooth speaker BL6, is lower than the preset threshold value (Step S209); maintaining the first Bluetooth connection and the second Bluetooth connection between the mobile device 110 and the first Bluetooth target speaker, such as the Bluetooth speaker BL6, if the first Bluetooth target speaker, such as the Bluetooth speaker BL6, is not lower than the preset threshold value (Step S210); first transmitting a control signal by the mobile device via the first Bluetooth connection to make the first Bluetooth target speaker, such as the Bluetooth speaker BL6, enter into standby state, disconnecting the first Bluetooth connection and the second Bluetooth connection between the mobile device and the first Bluetooth target speaker, such as the Bluetooth speaker BL6, if the first Bluetooth target speaker, such as the Bluetooth speaker BL6, is lower than the preset threshold value, returning back to the space, continuously finding and designating the second Bluetooth target speaker, such as the Bluetooth speaker BL4, within an effective radius range taking the mobile device 110 as the center, such as ER2, and establishing the first Bluetooth connection and the second Bluetooth connection with the second Bluetooth target speaker and transmitting the audio stream data to the second Bluetooth target speaker, such as the Bluetooth speaker BL4, by the mobile device 110 via the second Bluetooth connection for audio-stream broadcasting (Step S211).

Relevant details of the steps of the mobile audio stream broadcasting method regarding the mobile audio stream broadcasting system are described in the embodiments of FIG. 1, and thus it is not repeated thereto. It is clarified that, a sequence of steps in FIG. 2 is set for a need to instruct easily, and thus the sequence of the steps is not used as a condition in demonstrating the embodiments of the instant disclosure.

For a specific instruction on an operation process of the mobile audio stream broadcasting system 100 of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[One Embodiment of the Mobile Audio Stream Broadcasting Method]

Figure 3:
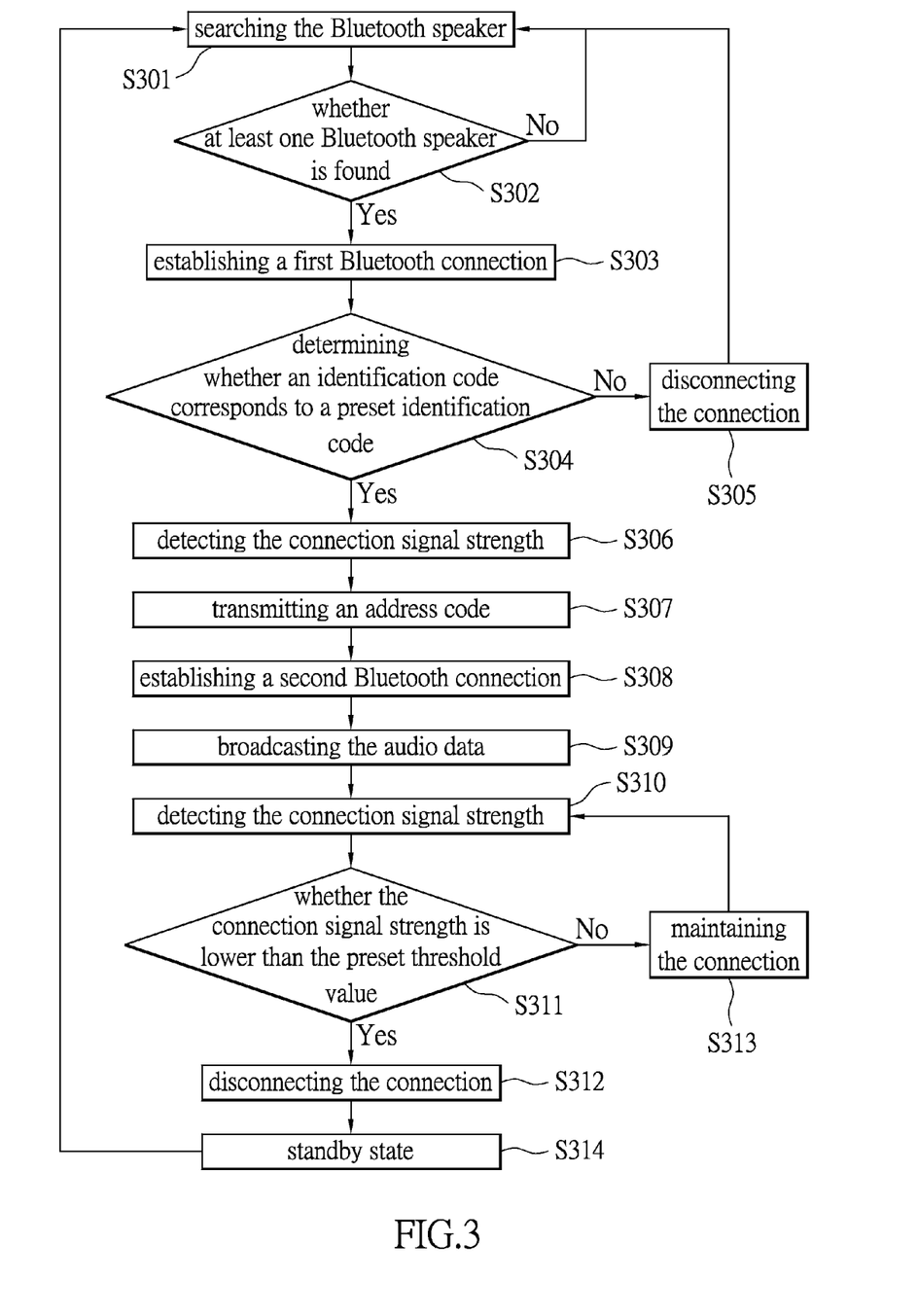
FIG. 3 shows a detailed flow chart of a mobile audio stream broadcasting method according to an embodiment of the instant disclosure.

In conjunction with FIG. 1 and FIG. 3, FIG. 3 shows a detailed flow chart of a mobile audio stream broadcasting method according to an embodiment of the instant disclosure. An explanatory sequence of steps in the present embodiment may be embodied with the mobile audio stream broadcasting system 100 as shown in FIG. 1, and thus please refer to FIG. 1 for an easy understanding. The mobile audio stream broadcasting method comprises steps as follows:

Step S301: searching the Bluetooth speaker. When the mobile device 110 and a plurality of Bluetooth speakers BL1~BL7 all have their Bluetooth communication function turned on, the mobile audio stream broadcasting method starts to search for at least one of the Bluetooth speakers BL1~BL7 within the effective radius range ER1 having the mobile device 110 as a center (such as the location A) so as to prepare fore matching and making a connection. Afterwards, the mobile audio stream broadcasting method goes to the Step S302.

Step S302: whether at least one Bluetooth speaker is found. The mobile audio stream broadcasting method determines whether the mobile device 110 finds at least one of the Bluetooth speakers BL1~BL7, when the mobile device 110 finds at least one of the Bluetooth speakers in the first group within the effective radius range ER1, for example, Bluetooth speakers BL2, BL4 and BL6 within the effective radius range ER1 are found, the mobile audio stream broadcasting method goes to Step S303. In particular, the Bluetooth speakers BL2, BL4 and BL6 within the effective radius range ER1 are defined as Bluetooth speakers in the first group. When the mobile device 110 has not yet found at least one of the Bluetooth speakers, the mobile audio stream broadcasting method returns to Step S301.

Step S303, establishing a first Bluetooth connection. In the present embodiment, when the mobile device 110 (at the location A) finds the Bluetooth speakers BL2, BL4 and BL6, the mobile device 110 establishes the first Bluetooth connection (that is, BT4.1+BLE) with the Bluetooth speakers BL2, BL4 and BL6, respectively. Also, the mobile device 110 remotely controls first Bluetooth connection, detects the connection signal strength and exchanges the battery information, via the first Bluetooth connection. After that, the mobile audio stream broadcasting method) goes to Step S304.

Step S304: determining whether an identification code corresponds to a preset identification code. The mobile device 110 determines whether the identification code of each of the Bluetooth speakers BL2, BL4 and BL6 corresponds to the preset identification code via the first Bluetooth connection, so as to exclude the Bluetooth speaker not produced via the instant disclosure.

Step S305: disconnecting the connection. If the mobile device 110 determines via the first Bluetooth connection that the identification code of Bluetooth speaker BL2, BL4 or BL6 does not correspond to the preset identification code, the mobile device 110 would disconnect the first Bluetooth connection with the Bluetooth speaker having the identification code not corresponding to the preset identification code. However, if all of the Bluetooth speakers BL2, BL4 and BL6 have the identification codes not corresponding to the preset identification code, the mobile audio stream broadcasting method returns to Step S301.

Step S306: detecting the connection signal strength. If the mobile device 110 determines via the first Bluetooth connection that there is the identification code of Bluetooth speaker BL2, BL4 or BL6 corresponding to the preset identification code, the mobile device 110 would detect the connection signal strength of the Bluetooth speaker having the identification code corresponding to the preset identification code via the first Bluetooth connection, and would designate the Bluetooth speaker having the maximum connection signal strength, such as the Bluetooth speaker BL6, as the first Bluetooth target speaker. Afterwards, the mobile audio stream broadcasting method goes to Step S307.

Step S307: transmitting an address code. The mobile device 110 would transmit an address code via the first Bluetooth connection to the first Bluetooth target speaker, such as the Bluetooth speaker BL6, such that the Bluetooth speaker BL6 can have an audio-connection according to the received address code. After that, the mobile audio stream broadcasting method goes to Step S308.

Step S308: establishing a second Bluetooth connection. The mobile device 110 would establish a second Bluetooth connection (BT2.1+EDR) with the first Bluetooth target speaker, such as the Bluetooth speaker BL6, so as to work via both BT2.1+EDR and BT4.0+BLE of the Bluetooth communication. Afterwards, the mobile audio stream broadcasting method goes to Step S309.

Step S309: broadcasting the audio data. The mobile device 110 would transmit the audio stream data, such as a music information, via the second Bluetooth connection to the first Bluetooth target speaker for the audio-stream broadcasting such that the user can listen to music via the Bluetooth speaker BL6. After that, the mobile audio stream broadcasting method goes to Step S310.

Step S310: detecting the connection signal strength. When the mobile device 110 transmits the audio stream data via the second Bluetooth connection to the first Bluetooth target speaker, such as the Bluetooth speaker BL6, for broadcasting, the mobile device 110 continuously and automatically detects the connection signal strength of the first Bluetooth target speaker via the first Bluetooth connection, and detects the connection signal strength of the Bluetooth speaker within the effective radius range ER1, such as the Bluetooth speaker BL2 and BL4. After that, the mobile audio stream broadcasting method goes to Step S311.

Step S311: whether the connection signal strength is lower than the preset threshold value. The mobile device 110 determines whether the connection signal strength of the first Bluetooth target speaker is lower than the preset threshold value, wherein the preset threshold value is set by the designer depending on needs practically. If the mobile device 110 determines that the connection signal strength of the first Bluetooth target speaker is lower than the preset threshold value, the mobile audio stream broadcasting method goes to Step S312. If the mobile device 110 determines that the connection signal strength of the first Bluetooth target speaker is higher than the preset threshold value, and the mobile audio stream broadcasting method goes to Step S313.

Step S312: disconnecting the connection. If the connection signal strength of the first Bluetooth target speaker, such as the Bluetooth speaker BL6, is lower than the preset threshold value, the mobile device 110 would disconnect with the first Bluetooth connection and the second Bluetooth connection. Afterwards, the mobile audio stream broadcasting method goes to Step S314.

Step S313: maintaining the connection. If the mobile device 110 determines that the connection signal strength of the first Bluetooth target speaker is not lower than the preset threshold value, the mobile device 110 would maintain the first Bluetooth connection and the second Bluetooth connection with the first Bluetooth target speaker and the first Bluetooth target speaker returns to Step S310 so as to continuously control the connection signal strength.

Step S314: standby state. When the mobile device 110 disconnects the second Bluetooth connection with the first Bluetooth target speaker, such as the Bluetooth speaker BL6, the mobile device 110 would transmit the control signal via the first Bluetooth connection to make the first Bluetooth target speaker (that is, the Bluetooth speaker BL6) enter into standby state, and the mobile audio stream broadcasting method returns to Step S301 so as to search for the second Bluetooth target speaker within the effective radius range ER2 taking the mobile device 110 as the center, such as the location B, and wherein the Bluetooth speakers BL4 and BL5 within the effective radius range ER2 are defined as Bluetooth speakers in the second group.

To sum up, the mobile audio stream broadcasting method and the mobile audio stream broadcasting system can detect the connection signal strength of the Bluetooth speaker via the first Bluetooth connection, and can transmit the audio stream data to the Bluetooth target speaker for broadcasting via the second Bluetooth connection. Accordingly, the instant disclosure can automatically detect the connection signal strength between the mobile device and the Bluetooth speaker to make a connection or disconnection, so as to avoid the inconvenience when the user manually switches between speakers in a multi-speakers environment. The instant disclosure can increase the convenience for use and can switch between different Bluetooth target speakers for broadcasting music according to the location of the mobile device which changes when the user moves, such that the user can enjoy music anywhere he moves.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A mobile audio stream broadcasting method, comprising steps as follows:

searching for a plurality of Bluetooth speakers, using a mobile device, in a space;

finding at least one of the Bluetooth speakers, using the mobile device, within a first effective radius range taking the mobile device as the center;

establishing a first Bluetooth connection between the mobile device and at least one of the Bluetooth speakers;

determining whether an identification code of at least one of the Bluetooth speakers corresponds to a preset identification code by the mobile device via the first Bluetooth connection;

detecting a connection signal strength of the Bluetooth speaker corresponding to the preset identification code and designating the Bluetooth speaker with maximum of the connection signal strength as a first Bluetooth target speaker, if the identification code of at least one of the Bluetooth speakers corresponds to the preset identification code;

establishing a second Bluetooth connection between the mobile device and the first Bluetooth target speaker;

transmitting an audio stream data to the first Bluetooth target speaker by the mobile device via the second Bluetooth connection for audio-stream broadcasting;

detecting the connection signal strength of the first Bluetooth target speaker continuously and automatically by the mobile device via the first Bluetooth connection;

determining whether the connection signal strength of the first Bluetooth target speaker is lower than a preset threshold value;

maintaining the first Bluetooth connection and the second Bluetooth connection between the mobile device and the first Bluetooth target speaker, if the connection signal strength of the first Bluetooth target speaker is not lower than the preset threshold value; and transmitting a control signal by the mobile device to control the first Bluetooth target speaker to enter into a standby state and disconnecting the first Bluetooth connection and the second Bluetooth connection between the mobile device and the first Bluetooth target speaker, if the connection signal strength of the first Bluetooth target speaker is lower than the preset threshold value, and returning back to the space, finding and designating a second Bluetooth target speaker within a second effective radius range taking the mobile device as the center, and establishing the first Bluetooth connection and the second Bluetooth connection with the second Bluetooth target speaker, transmitting the audio stream data to the second Bluetooth target speaker by the mobile device via the second Bluetooth connection for audio-stream broadcasting.

2. The mobile audio stream broadcasting method according to claim 1, wherein after the step that maintaining the first Bluetooth connection and the second Bluetooth connection between the mobile device and the first Bluetooth target speaker, if the connection signal strength of the first Bluetooth target speaker is not lower than the preset threshold value, it returns back to the step that detecting the connection signal strength of the first Bluetooth target speaker continuously and automatically.

3. The mobile audio stream broadcasting method according to claim 1, after the step that determining whether an identification code of at least one of the Bluetooth speakers corresponds to a preset identification code by the mobile device via the first Bluetooth connection, further comprising a step as follows:

disconnecting the first Bluetooth connection between the mobile device and the Bluetooth speaker not corresponding to the preset identification code, if the identification code of at least one of the Bluetooth speakers does not correspond to the preset identification code.

4. The mobile audio stream broadcasting method according to claim 1, wherein before the step that detecting the connection signal strength of the first Bluetooth target speaker continuously and automatically by the mobile device via the first Bluetooth connection, further comprising:

transmitting an address code to the first Bluetooth target speaker by the mobile device via the first Bluetooth connection.

5. A mobile audio stream broadcasting system, comprising:

a mobile device; and a plurality of Bluetooth speakers, the mobile audio stream broadcasting system searching for a plurality of Bluetooth speakers in a space and finding at least one of the Bluetooth speakers, using the mobile device, within a first effective radius range taking the mobile device as the center;

wherein a first Bluetooth connection is established between the mobile device and at least one of the Bluetooth speakers and the mobile device determines whether an identification code of at least one of the Bluetooth speakers corresponds to a preset identification code via the first Bluetooth connection;

wherein a connection signal strength of the Bluetooth speaker corresponding to the preset identification code is detected and the Bluetooth speaker with maximum of the connection signal strength is designated as a first Bluetooth target speaker, if the identification code of at least one of the Bluetooth speakers corresponds to the preset identification code, a second Bluetooth connection between the mobile device and the first Bluetooth target speaker is established, and an audio stream data is transmitted to the first Bluetooth target speaker by the mobile device via the second Bluetooth connection for audio-stream broadcasting;

wherein the mobile device detects the connection signal strength of the first Bluetooth target speaker continuously and automatically by the mobile device via the first Bluetooth connection and determines whether the connection signal strength of the first Bluetooth target speaker is lower than a preset threshold value;

wherein the first Bluetooth connection and the second Bluetooth connection between the mobile device and the first Bluetooth target speaker are maintained, if the connection signal strength of the first Bluetooth target speaker is not lower than the preset threshold value;

wherein the mobile device transmits a control signal to control the first Bluetooth target speaker to enter into a standby state and disconnects the first Bluetooth connection and the second Bluetooth connection between the mobile device and the first Bluetooth target speaker, if the connection signal strength of the first Bluetooth target speaker is lower than the preset threshold value, and it returns back to the space, finds and designates a second Bluetooth target speaker within a second effective radius range taking the mobile device as the center, and the first Bluetooth connection and the second Bluetooth connection with the second Bluetooth target speaker are established, and the audio stream data is transmitted to the second Bluetooth target speaker by the mobile device via the second Bluetooth connection for audio-stream broadcasting.

6. The mobile audio stream broadcasting system according to claim 5, wherein the first Bluetooth connection between the mobile device and the Bluetooth speaker not corresponding to the preset identification code is disconnected, if the identification code of at least one of the Bluetooth speakers does not correspond to the preset identification code.

7. The mobile audio stream broadcasting system according to claim 5, wherein an address code is transmitted to the first Bluetooth target speaker by the mobile device via the first Bluetooth connection.

* * * * *